J. L. ELLIS.
EDUCATIONAL DEVICE.
APPLICATION FILED JAN. 6, 1914.
1,142,947.
Patented June 15, 1915.
2 SHEETS—SHEET 1.
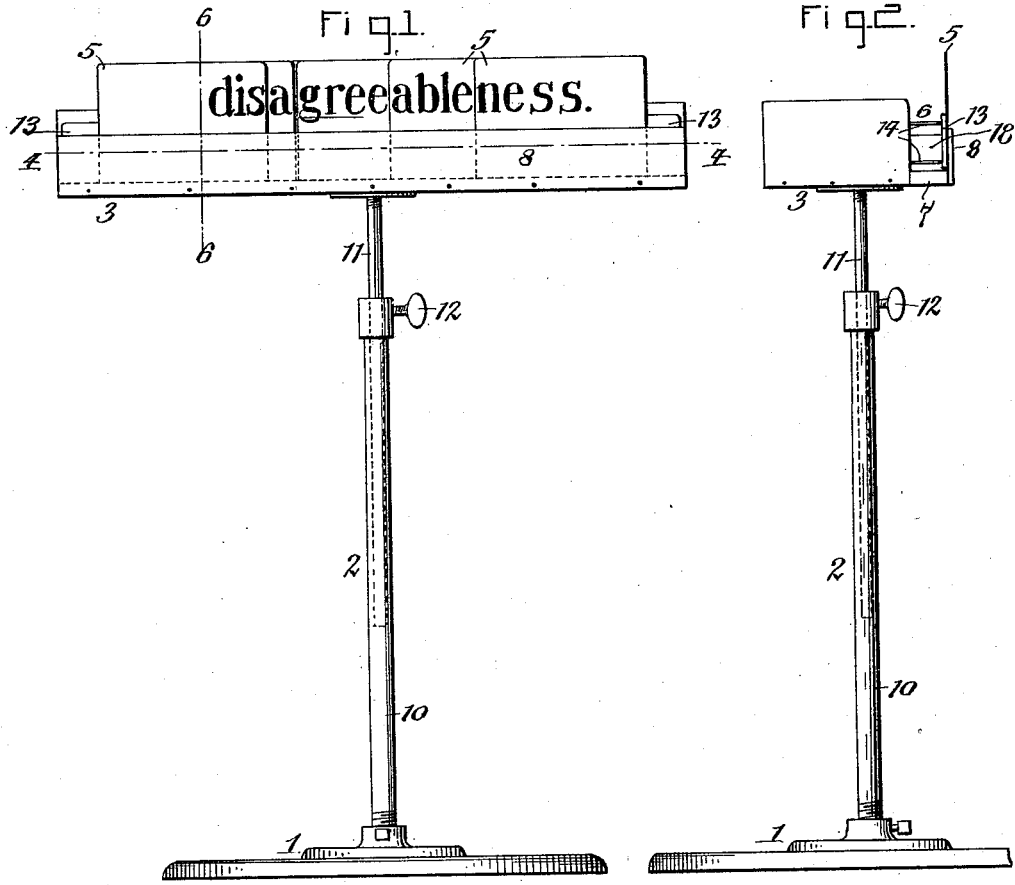
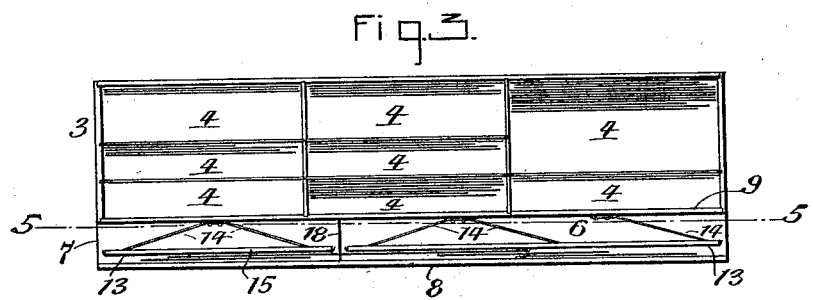
WITNESSES
INVENTOR

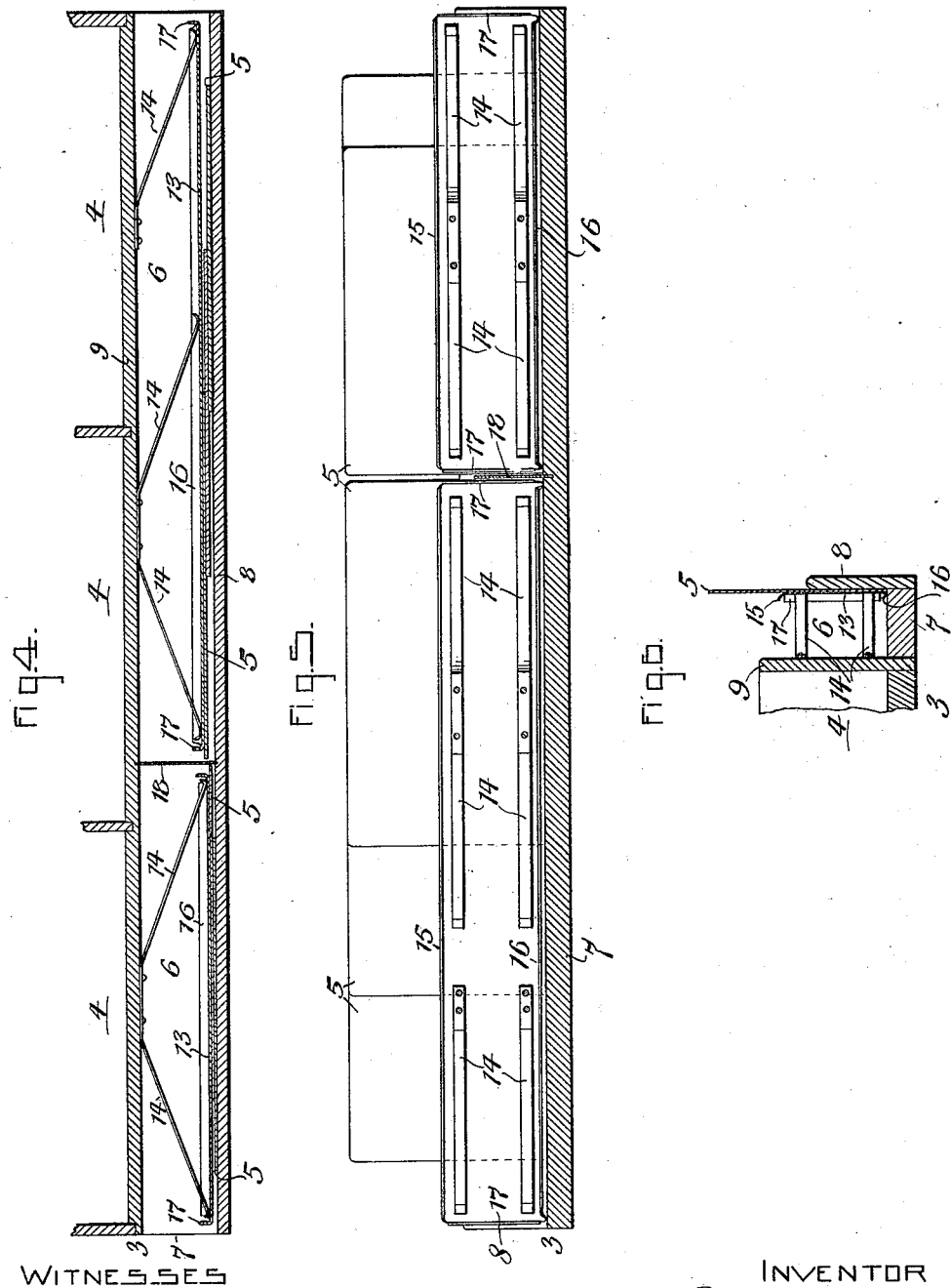

UNITED STATES PATENT OFFICE.

JANE L. ELLIS, OF BUFFALO, NEW YORK.

EDUCATIONAL DEVICE.

1,142,947.  Specification of Letters Patent.  Patented June 15, 1915.

Application filed January 6, 1914. Serial No. 810,584.

*To all whom it may concern:*

Be it known that I, JANE L. ELLIS, a citizen of the United States, residing at Buffalo, in the county of Erie and State of New York, have invented new and useful Improvements in Educational Devices, of which the following is a specification.

This invention relates to an educational device which is more particularly designed for storing and exhibiting cards for use in building or forming words and the exhibit of cards bearing complete words as an aid in teaching phonetic spelling, derivation, similarity of words and other features of language teaching. This device may, however, also be used for storing and exhibiting cards bearing other characters.

It is the object of this invention to provide a device for storing and exhibiting cards of this character which is simple, and inexpensive in construction, which will permit of compactly storing the cards when not in use and enable any card or combination of cards to be easily assembled or distributed and reliably held in an upright position for building words by properly associating the various cards bearing parts of the words and also of exhibiting cards bearing whole words for purpose of grammar review work and other language teaching.

In the accompanying drawings, Figure 1 is a front elevation of my improved educational device. Fig. 2 is an end elevation of the same. Fig. 3 is a top plan view thereof. Fig. 4 is a fragmentary horizontal longitudinal section, on an enlarged scale, taken in line 4—4, Fig. 1. Fig. 5 is a fragmentary vertical longitudinal section, on an enlarged scale, taken in line 5—5, Fig. 3 and looking toward the front of the device. Fig. 6 is a fragmentary vertical transverse section, on an enlarged scale, taken in line 6—6 Fig. 1.

Similar characters of reference indicate corresponding parts throughout the several views.

In its general organization my improved educational device comprises a base 1 which is adapted to rest on the floor or ground, a column 2 rising from the base, and a body 3 supported at the upper end of the column. If desired, the column and base may be omitted in which case the body may rest on top of a table or other convenient support.

The body is preferably constructed mainly of wood although any other suitable material may be used. In the form shown in the drawings the body is preferably provided in its rear part with a plurality of compartments 4 of any suitable dimensions and opening upwardly to permit of introducing the cards 5 into the compartments or removing the same therefrom. In its front part the body has an exhibiting space 6 having preferably the form of a longitudinal channel which is open at the top and at its opposite ends and has a horizontal bottom 7, and upright front and rear walls 8, 9 arranged respectively at the front and rear edges of the bottom. When a column is employed for supporting this body the same is preferably made vertically adjustable for adapting the body to the height of the children which are being taught or for other purposes. This adjustment may be made in various ways, for instance, as shown in the drawings by constructing the column in the form of a lower hollow pillar 10 which is secured at its lower end to the base, and an upright stem or adjusting rod 11 secured at its upper end to the underside of the body while its lower end is adjustably secured within the hollow pillar by means of a set or clamping screw 12 arranged on the upper part of the pillar and engaging with the side of the adjusting rod.

The cards 5 bearing different words or parts of words are taken from the storage compartments and placed in an upright position adjacent to the rear side of the front wall 8 of the exhibiting space or channel and engaged at their lower edges with the bottom of this space, the letters, words or parts of words being arranged on the front sides of the cards and at a height from the lower edges thereof that these words, parts of words or letters will be exposed above the upper edge of said front wall, as shown in Fig. 1. These cards are frictionally held in position against the front wall of the exhibiting space and against each other by means of a yielding presser device which preferably, though not necessarily, is constructed, as shown in the drawings. In this preferred form of pressing device the same comprises a plurality of presser plates or followers 13 constructed of sheet metal or other suitable material and arranged vertically and lengthwise within the exhibiting space or channel and held yieldingly in engagement with the rear sides of the cards by means of springs 14. The latter are preferably constructed in the form of leaves and secured at their fixed rear ends to the rear wall of the exhibiting space while their front ends bear loosely against the rear sides of the presser plates. The upper edges of these presser plates preferably extend above the upper edge of the front wall of the exhibiting space in order to permit of conveniently introducing or pushing the cards downwardly between this wall and the presser plates. In order to stiffen the plates each of these is provided at its upper and lower horizontal edges and at its opposite vertical edges with rearwardly projecting vertical flanges 15, 16, 17. In the absence of any provision to prevent it the presser plates would be liable to vertical displacement as well as horizontal displacement lengthwise of the exhibiting space or channel. In order to prevent this the flanges of the plates are utilized as stop devices by arranging the presser springs so that the free front ends of the same bear against the rear sides of the plates within the horizontal and vertical flanges at the margins thereof. By this means the lower horizontal flange of each plate will prevent the same from being lifted out of the exhibiting space while the vertical flanges will prevent lengthwise displacement of the respective plate in the exhibiting space by engagement of said flanges with the companion springs.

Within the exhibiting space and extending transversely from the front wall to the rear wall thereof is a thin gage or partition 18 which practically divides the exhibiting space into two sections and against opposite sides of which two cards bearing different parts of a word are adapted to abut. By this means the cards bearing the two main parts of a word may be first assembled or associated in a definite position within the exhibiting space and then other cards bearing suffixes, prefixes or the like may be added to the first mentioned cards at the front and rear ends thereof for building up derivatives from these parts or base, represented on the two cards, etc. Example:

| un | s | elf | ish | represented on the two cards engaging with opposite sides of the gage, without liability of displacing these cards relatively to each other in the direction of the length of the holder. In words of foreign derivation the base appears on one card, placed on the right hand of the gage and touching the same. Affix cards are then added. Example:—

| dis | a | gree | able | ness |

Inasmuch as the additions of cards for building a word usually is more extensive relative to the card engaging with the right side of the gage the latter is placed somewhat nearer the left end of the exhibiting space, as shown in Figs. 3, 4 and 5, and thereby leave more room in this space between its right end and the gage for accommodating such larger number of cards which are likely to be assembled in this part of the exhibiting space. This right hand space allows ample room for spelling and separating into syllables words of great length.

In the use of this device a selection of cards for a lesson or a series of lessons is put in any desired order in the several compartments ready for use, these compartments being sufficiently large to permit of storing therein the number of cards which are likely to be used in a lesson.

Innumerable words may be formed through the process of blending initial letters with vowel combinations (called, for convenience, "phonograms"), prefixes and suffixes with base, thus teaching the construction and meaning of words. These words or parts of words are printed at the beginning or ending of cards according to whether they form initial letter or letters, phonograms, affix or base. As examples illustrating cards thus prepared the word "say" may be built up by placing the letter "s" at the right hand end of one card and the letters "ay" at the left hand end of another card so that when these two cards are placed with their right and left edges respectively in engagement with opposite sides of the gage or partition they will form the word "say." In like manner the word "unkindness" may be built up, by placing a card showing letters "un" printed at right hand end of one card next to "kind" either printed in the center of a card or built up as explained for "say," and placing another card showing "ness" printed at left hand end, at right of "kind." It will thus be manifest that the beginning and ending cards form words by placing the same in a vertical position between the front wall and presser plates and on opposite sides of the thin gage or partition which latter permits these cards to be practically brought together edge to edge so that the letters of the several cards appear to form an unbroken line. Prefix and suffix cards may also be added and easily brought to the exact position relative to cards which engage with opposite sides of the gage or partition, the exhibit space being long enough to afford the necessary range for the building of words of any length which are likely to be taught, as for instance, the word "disagreeableness" as illustrated in Fig. 1. It will be obvious that this work of word-building may be done rapidly, accurately and with certainty. Cards having complete words printed in the middle of the exposed space of the card may also be used in the teaching of grammar work, such as the comparison of adjectives and adverbs, the principal parts of verbs, the gender and plural of nouns, it being possible to show this work speedily and accurately by means of this educational device. Synonyms, antonyms and homonyms may also be shown relatively in like manner.

In exhibiting the principal parts of verbs, cards or greater length may be used, showing the four parts together and at once, as illustrated by the following example: " say, said, saying, said."

Cards similarly classified may be placed together in the exhibit space and shown by the removal of the card at the back to the front, the word, words, or part of a word on each card being printed in small type on the back of that card, for the teacher's convenience in handling.

I claim as my invention:

1. An educational device comprising receptacles arranged lengthwise side by side and adapted to receive character bearing cards and separated by a transverse gage which is adapted to be engaged on its opposite sides by the vertical edges of cards in said receptacles.

2. An educational device, comprising a front wall adapted to be engaged on its rear side by cards bearing characters, and a pressing device comprising a plate engaging with the rear sides of the cards and provided with marginal flanges which project rearwardly, and springs engaging with the rear side of said plate within said flanges.

3. An educational device for use with character bearing cards, comprising a longitudinal front wall, a gage arranged transversely in rear of the front wall, and pressing devices arranged on opposite sides of said gage and adapted to hold the cards against the rear side of said front wall.

4. An educational device for use with character cards, comprising an exhibiting space having a front wall and means for holding said cards in engagement with the rear side of said wall comprising a presser plate arranged in rear of said wall and extending above the latter.

Witness my hand this 2nd day of January, 1914.

JANE L. ELLIS.

Witnesses:
  THEO. L. POPP,
  ANNA HEIGIS.

Copies of this patent may be obtained for five cents each, by addressing the " Commissioner of Patents, Washington, D. C."

Correction in Letters Patent No. 1,142,947.

It is hereby certified that in Letters Patent No. 1,142,947, granted June 15, 1915, upon the application of Jane L. Ellis, of Buffalo, New York, for an improvement in "Educational Devices," an error appears in the printed specification requiring correction as follows: Page 3, line 11, for the word "or" read *of;* and that the said Letters Patent should be read with this correction therein that the same may conform to the record of the case in the Patent Office.

S'gned and sealed this 6th day of July, A. D., 1915.

[SEAL.] R. F. WHITEHEAD,
*Acting Commissioner of Patents.*